Nov. 6, 1934.  C. N. HOUSE  1,979,388
BEARING AND SEAL THEREFOR

Filed May 20, 1930

INVENTOR:
CLIFFORD N. HOUSE,
BY
Gales P. Moore

HIS ATTORNEY.

Patented Nov. 6, 1934

1,979,388

UNITED STATES PATENT OFFICE 1,979,388

BEARING AND SEAL THEREFOR

Clifford N. House, Detroit, Mich., assignor, by mesne assignments, to General Motors Corporation, Detroit, Mich., a corporation of Delaware Application May 20, 1930, Serial No. 453,942

10 Claims. (Cl. 308—187)

This invention relates to bearings and seals therefor and comprises all the features of novelty herein disclosed. An object of the invention is to provide an improved unit-handling bearing and seal. Another object is to provide an antifriction bearing having sealing means incorporated therewith for preventing leakage of lubricant or foreign matter between the bearing and the casing or other member which supports the bearing. Another object is to provide an antifriction bearing mounting and sealing means which not only closes the space between the race rings of the bearing but also seals the joint between one of those rings and its support, these devices all preferably being incorporated into a unit-handling structure ready for application to a shaft and a casing.

To these ends and also to improve generally upon devices of the character indicated the invention consists in the various matters hereinafter described and claimed. In its broader aspects, the invention is not necessarily limited to the specific construction selected for illustrative purposes in the accompanying drawing in which Fig. 1 is a cross sectional view of a sealed up bearing and its mounting.

Figure 1:
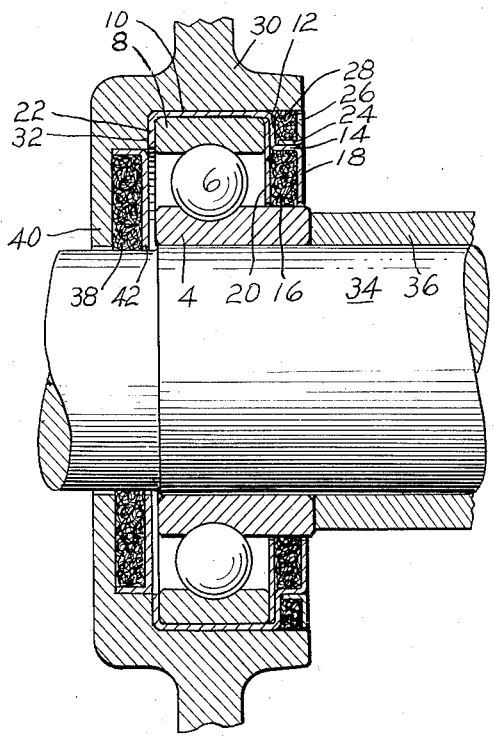
Figure 2:
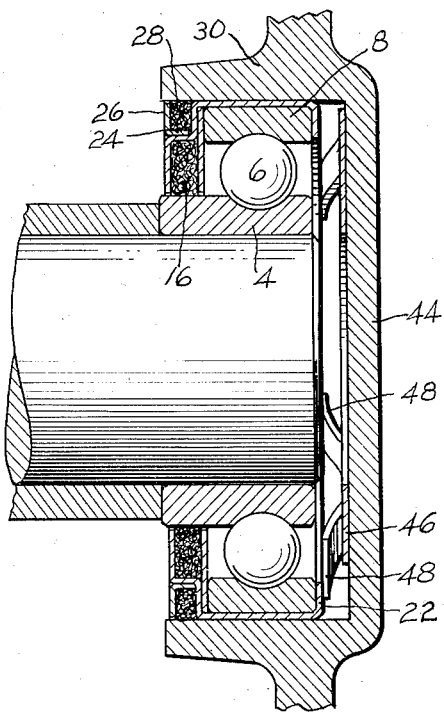

Fig. 2 is a similar view of a suitable companion mounting for the device of Fig. 1.

The numeral 4 indicates the inner race ring of an antifriction bearing herein shown as having a row of balls 6 and an outer race ring 8. A sheet metal plate or shell 10 encloses the outer race ring, one end of the plate or shell having a bent-in wall 12 and a cupped portion or axial extension 14, the latter enclosing a sealing washer 16 held between a terminal flange 18 and a separate plain washer 20 which is clamped between the end of the outer race ring and the bent-in wall 12. The flange 18 and the washer 20 form the side walls of a groove receiving the packing or sealing washer 16. The sealing washer 16 runs on a finished cylindrical face on the outer periphery of the inner race ring which is extended axially beyond the outer race ring and through the washer 16 and through the end of the flange 18, the metal parts just clearing the inner race ring. The other end of the shell has a holding flange 22 bent down against the opposite end of the outer race ring to hold the parts assembled into a unit handling structure. The cupped portion or extension 14 preferably has a substantially cylindrical outer surface or wall which is frictionally engaged by the inner surface or wall of an axial flange 24 on a shield or retaining washer 26, a packing or sealing washer 28 being confined between the washer 26 and the bent-in wall 12. The sealing washer extends outwardly beyond the washer 26 at least as far as the outer periphery of the shell 10 but is compressed to the outer diameter of the shell when the bearing is installed in a bearing seat.

According to one typical way of mounting the bearing between relatively rotatable members, the shell 10 is supported by the bore of a casing 30 having an annular shoulder 32 acting as an abutment for the flange 22 of the shell. The inner race ring 4 is supported by a shaft 34, a suitable shoulder or spacer 36 on the shaft acting as an abutment for the inner race ring. If the shaft projects through the casing, the joint is desirably sealed, as by the sealing washer 38 held between a flange 40 of the casing and a flanged retaining washer 42. Bearing lubricant is thus sealed by the washer 38 against escape along the shaft, is sealed by the washer 16 against escape along the outer periphery of the inner race ring, and is sealed against leakage between the shell 10 and the casing 30 by the washer 28. It will be understood that the outer race ring with its shell 10 will ordinarily have a push or sucking fit in the casing seat making such leakage possible whereas the inner race ring will ordinarily have a press fit on its support. Besides acting as a seal, the washer 28 exerts a frictional resistance which tends to prevent turning of the shell in the bore of the casing. If placed at the outside of an enclosure of which the member 30 forms one end wall, the sealing washer 28 will be effective in preventing dust and grit from working in and scoring the bearing seat; more often the washer will be at the inner side of the enclosure making its lubricant maintaining function the more important.

A typical companion mounting for that of Fig. 1 is illustrated in Fig. 2 wherein the casing has a closed end wall 44 extending across the end of the shaft. The unit-handling bearing and seal is mounted in the same way except that it can float axially in the bore, a washer 46 engaging the end wall and having spring fingers 48 which press against the flange 22 and so tend to hold the outer race ring of the companion bearing against its abutment 32 while compensating for inaccuracies or for expansion of the shaft.

In most instances, the shaft 34 will be a rotary member and the casing 30 will be a stationary supporting member but such relations may be reversed and, in some mountings, both such parts may be capable of rotating at different speeds.

I claim:

1. In an antifriction bearing and seal, a bearing comprising an inner race ring, an outer race ring and a row of rolling elements between the rings, a plate attached to the outer race ring and having a wall extending substantially axially from the bearing, said wall having an external diameter smaller than that of the bearing, and a sealing device surrounding said wall and supported thereby, the sealing device having an external diameter substantially equal to that of the bearing to prevent leakage between the periphery of the bearing and a bearing seat; substantially as described.

2. In an antifriction bearing and seal, a bearing comprising an inner race ring, an outer race ring and a row of rolling elements between the rings, a plate connected to one of the race rings and having an axial extension at one side of the bearing, the axial extension being of smaller diameter than the bearing, a sealing washer inside of said extension, and a sealing washer outside of said extension and extending substantially to the outer periphery of the bearing; substantially as described.

3. In an antifriction bearing and seal, a bearing comprising an inner race ring, an outer race ring and a row of rolling elements between the rings, a shell surrounding the outer race ring and having a bent-in wall and an axial extension, and a sealing device for the outer periphery of the bearing and carried on the outside of said extension; substantially as described.

4. In a bearing mounting, a bearing comprising an inner race ring, an outer race ring and a row of rolling elements between the rings, relatively rotatable supports for the race rings, a plate carried by one of said race rings and having an extension at one side of the bearing, a sealing device at the inside of said extension, and a sealing device at the outside of said extension, one of said sealing devices closing the space between said race rings and the other sealing device being extended into contact with the support for one of the race rings; substantially as described.

5. In combination, a bearing having an inner ring, an outer ring and anti-friction members therebetween, one of said rings being adapted to be fixed to a rotating member and the other of said rings being adapted to be substantially stationarily supported by a supporting member; means carried by the stationary ring for sealing the space between the rings, and sealing means carried by said stationary ring for preventing the leakage of lubricant between the stationary ring and its supporting member.

6. In combination, a bearing having an inner ring, an outer ring and anti-friction members therebetween; a shell carried by one of said rings and having a groove, a packing in said groove and engaging the other of said rings, a shield carried by said shell, and a packing in said shield.

7. In an antifriction bearing and seal, a bearing comprising an inner race ring, an outer race ring and a row of rolling elements between the rings, the race rings providing a space for bearing lubricant at the sides of the rolling elements, and a lubricant sealing washer attached to the bearing, the washer having one periphery extended at least as far as the corresponding periphery of the bearing to prevent leakage of the bearing lubricant between the periphery of the bearing and a supporting seat; substantially as described.

8. In an antifriction bearing and seal, a bearing comprising an inner race ring, an outer race ring and a row of rolling elements between the rings, a plate having a wall projecting substantially axially from one side of one race ring, a flanged washer engaging said wall and supported thereby, and a sealing washer between said flanged washer and the one race ring; substantially as described.

9. In an antifriction bearing and seal, a bearing comprising an inner race ring, an outer race ring and a row of rolling elements between the rings, means carried by one of the race rings for sealing the space between the rings, and means carried by one of the race rings for preventing leakage between such race ring and a supporting seat; substantially as described.

10. In an antifriction bearing and seal, a series of rolling elements, an imperforate race ring having a groove for the rolling elements, a member having a supporting seat for the race ring, and a lubricant sealing washer attached to the race ring independently of the seat-forming member, and the washer having one periphery extended at least as far as the corresponding periphery of the race ring to engage the seat-forming member and prevent leakage of bearing lubricant between the latter and the race ring; substantially as described.

CLIFFORD N. HOUSE.